United States Patent
Poulo

(10) Patent No.: US 9,893,879 B2
(45) Date of Patent: Feb. 13, 2018

(54) METHOD FOR AUTOMATICALLY FINDING THE OPTIMUM SAMPLING POINT IN AN EYE DIAGRAM

(71) Applicant: Tektronix, Inc., Beaverton, OR (US)

(72) Inventor: Richard J. Poulo, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 15/238,089

(22) Filed: Aug. 16, 2016

(65) Prior Publication Data
US 2017/0085366 A1 Mar. 23, 2017

Related U.S. Application Data

(60) Provisional application No. 62/221,515, filed on Sep. 21, 2015.

(51) Int. Cl.
*H04L 7/08* (2006.01)
*H04L 25/49* (2006.01)
(Continued)

(52) U.S. Cl.
CPC ............ *H04L 7/08* (2013.01); *H04L 1/20* (2013.01); *H04L 1/205* (2013.01); *H04L 7/0087* (2013.01); *H04L 25/4917* (2013.01)

(58) Field of Classification Search
CPC ....... H04L 7/08; H04L 25/4917; H04L 1/205; H04L 7/20; H04L 7/0087
See application file for complete search history.

(56) References Cited

U.S. PATENT DOCUMENTS

| 2004/0078158 | A1* | 4/2004 | MacDonald | G01R 29/26 702/66 |
| 2004/0125874 | A1* | 7/2004 | Baumert | H04B 10/2569 375/226 |

(Continued)

OTHER PUBLICATIONS

Evangeline, D et al., "2D Polygon clipping using Shear Transformation: An extension of Shear based 2D line Clipping", 2014 IEEE International Conference on Advanced Communications Control and Computing Technologies, May 8, 2014, pp. 1379-1383, IEEE.

(Continued)

*Primary Examiner* — Syed Haider
(74) *Attorney, Agent, or Firm* — Marger Johnson; Kevin Dothager; Andrew J. Harrington

(57) ABSTRACT

A system and method of multi-symbol communications from a transmitter to a receiver via a channel, including transmitting signals as a waveform representing a sequence of symbols, each symbol of unit-interval duration and each symbol associated with its own signal level. This method includes graphically representing the waveform as an eye diagram having a horizontal time axis and a vertical signal level axis arranged to form one or more eyes, and using a sampling point in each eye to determine which signal the waveform in any unit interval represents. Each sampling point has a phase and a decision threshold. The method further includes identifying the eyes in the eye diagram, finding a convex polygonal region fitting within each eye, finding a largest rectangle fitting the convex polygonal region of each eye, and positioning the sampling point in each eye at a center of the rectangle of that eye.

14 Claims, 16 Drawing Sheets

(51) Int. Cl.
  *H04L 7/00* (2006.01)
  *H04L 1/20* (2006.01)

(56) References Cited

U.S. PATENT DOCUMENTS

| | | | |
|---|---|---|---|
| 2006/0188045 A1* | 8/2006 | Nygaard, Jr. | H04L 1/205 375/348 |
| 2007/0268984 A1* | 11/2007 | Abel | H04L 1/205 375/285 |
| 2016/0072650 A1* | 3/2016 | Mobin | H04L 25/0278 375/219 |

OTHER PUBLICATIONS

Extended European Search Report and Opinion for European Patent Application EP 16189978.6, dated Jan. 19, 2017, 10 pages, European Patent Office, Munich, Germany.

* cited by examiner

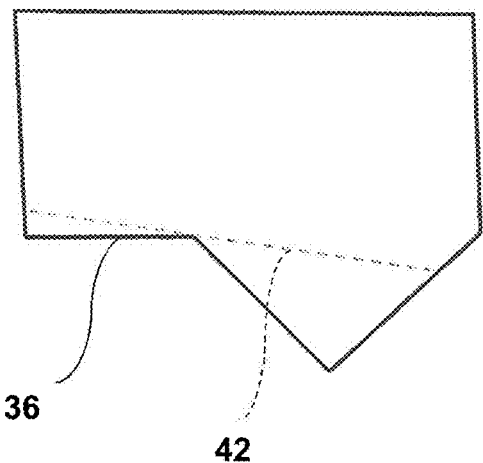
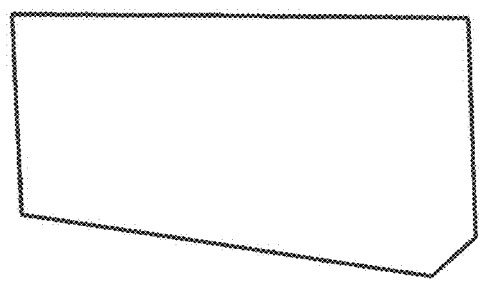
FIG. 6A
FIG. 6B
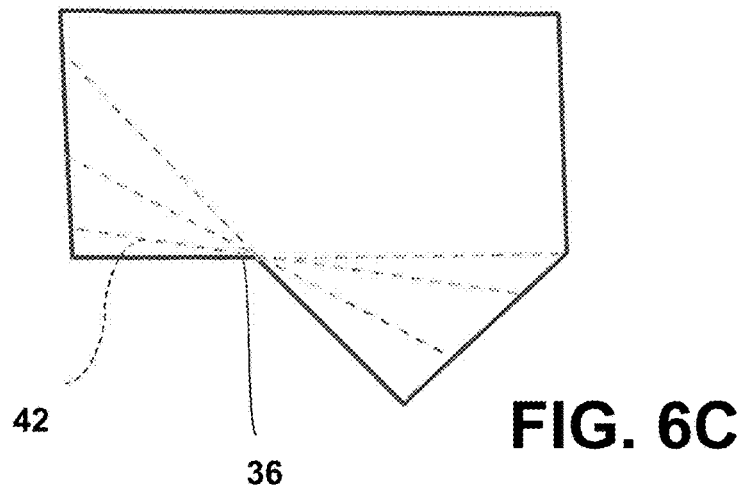
FIG. 6C

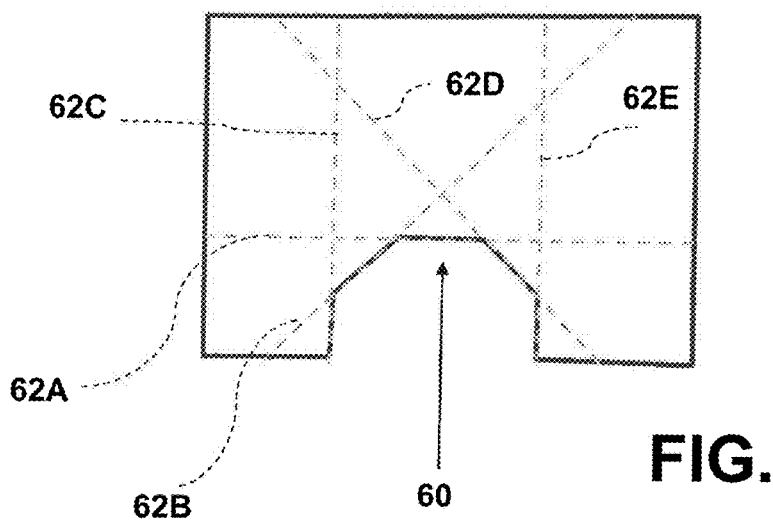
FIG. 12B
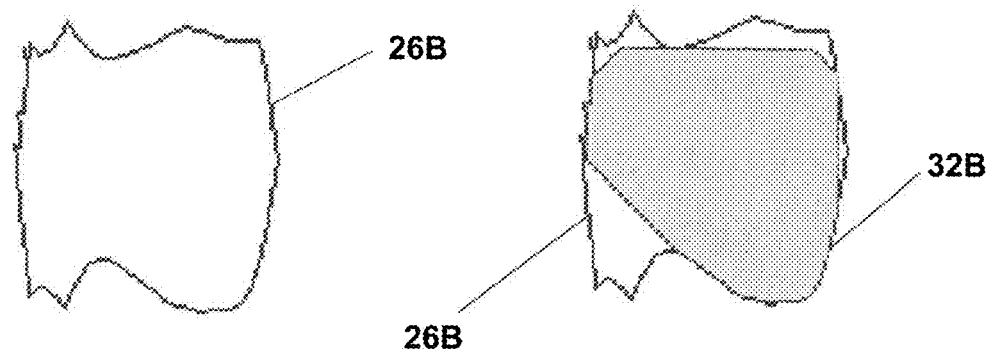
FIG. 13A
FIG. 13B

66A

66B

66C

METHOD FOR AUTOMATICALLY FINDING THE OPTIMUM SAMPLING POINT IN AN EYE DIAGRAM

CROSS-REFERENCES TO RELATED APPLICATIONS

This patent application claims the benefit of provisional Application No. 62/221,515, filed Sep. 21, 2015, which is incorporated in this patent application by this reference.

BACKGROUND OF THE INVENTION

A communications system consists of a transmitter 20, a channel 22 connecting the transmitter to a receiver 24, and the receiver itself, as shown in FIG. 1. The transmitter transmits a signal consisting of a sequence of symbols, each symbol being transmitted for the same predefined length of time called a unit interval. Historically there have been only two symbols denoted as 0 and 1. Newer communication standards propose using more symbols, e.g., a new proposal at this time is PAM4 which defines four symbols (0, 1, 2 and 3), any one of which can be transmitted in one-unit interval. Regardless of the number of symbols, each symbol is associated with its own signal level which is either its own electrical voltage or its own optical intensity.

An eye diagram is a standard means of graphically representing all possible unit-interval sized waveforms of a signal by overlaying all of them in a graph just one-unit interval wide. The value of each waveform at any point in the unit interval is determined by the following:
- the symbol as sent by the transmitter in the unit interval for that particular waveform,
- degraded by the dispersion and other characteristics of the channel,
- influenced by the symbols of the N previous unit intervals for some N determined by the characteristics of the channel (this is called inter-symbol interference),
- influenced by various sources of jitter (Gaussian, periodic),
- influenced by various sources of signal noise (Gaussian, periodic),
- influenced by crosstalk (electromagnetic interference due to radiation from other nearby signal carriers), and
- influenced by other effects (e.g., duty cycle distortion)

The horizontal axis of an eye diagram is a time axis. The vertical axis is the signal level and is measured in volts for electrical systems and in watts for optical systems. A sample eye diagram 26 for a PAM4 system is shown in FIG. 2. Note that it has three eyes that separate the four signal levels of PAM4. The white crosses 30 are the sampling points as determined by this method.

The nomenclature "eye diagram" takes its name from the shape of the center, clear area of the diagram and its frequent resemblance to a human eye. This area is clear because normally (in the absence of noise or phase jitter) no waveforms pass through it. The importance of an eye diagram (and in particular of the eye) is that the sampling point can be placed almost anywhere in the eye itself.

A sampling point is the point in the unit interval used by the receiver to determine which signal the waveform in any unit interval represents (e.g., in a two symbol system, whether the waveform in any given unit interval represents 0 or 1.) To determine the correct signal, one sampling point is needed in each eye. For example, the waveform in a four-symbol system may represent a 0, 1, 2 or 3 in any given unit interval, so three sampling points are used, one in each of the three eyes. The method described herein is applicable to any eye in any system with any number of symbols.

A sampling point is defined by its two coordinates.

The horizontal coordinate is time and is referred to as the phase of the sampling point. This is the time from the start of every unit interval when the receiver checks the signal level of the received waveform.

The vertical coordinate is the decision threshold, and is typically measured in volts or watts. Using the 0 and 1 symbols as an example, a receiver identifies a waveform that is above the decision threshold at the time of the sampling phase as a 1 and identifies a waveform that is below the decision threshold at that time as a 0.

In order to unambiguously recognize 0 and 1, there should be a vertical gap around the sampling point. There should also be a horizontal gap around the sampling point, because over time sampling points in real receiver's drift by a small amount (they actually drift in both time and signal level). It is for these reasons that eye diagrams are constructed, the eye identified and the sampling point placed within the eye.

Because a sampling point can drift (receivers are not perfect devices), it is desirable that the sampling point not be placed close to the edge of an eye. Some region around the nominal sampling point should be clear of waveforms. In fact, this is one of the purposes of mask testing. Not knowing the shape of a mask, we instead surround the sampling point with a rectangle into which a mask can later fit. The only questions are the size and aspect ratio of the rectangle. The aspect ratio will be determined from practical knowledge of receivers and a numeric value. The aspect ratio may be selected to allow a certain amount of drift in the horizontal and vertical directions. In one embodiment, the aspect ratio may be selected so that the rectangle captures the same fraction of drift in both the horizontal and vertical directions. For example, one constant may be used for electrical receivers (e.g., X millivolts per picosecond), while another may be used for optical receivers (e.g., Y microwatts per picosecond).

For a given aspect ratio, however, the rectangle size should be made as large as possible. This invention provides a method to maximize the rectangle for a given aspect ratio.

An eye diagram can have concavities. There are at least two reasons for this but none are relevant to this invention. What is relevant, is that the concavities must be avoided when selecting a sampling point, because they limit the useful area of the eye.

SUMMARY OF THE INVENTION

Traditional means of analyzing eye diagrams consist of a sequence of one-dimensional steps. For example, a first step might be to measure the vertical eye opening at its tallest point. A second step might then be to take the midpoint of that vertical opening and measure the horizontal eye opening at that level. Such one-dimensional steps never analyze the eye as an entire two-dimensional entity. A quick summary of the method described herein is that it treats the eye diagram and (hence the eye) as a two-dimensional object, by applying two-dimensional techniques of image analysis to the problem.

BRIEF DESCRIPTION OF THE DRAWINGS

FIGS. 6A, 6B and 6C show several possibly cut lines that yield a convex polygon.

FIGS. 12A and 12B show a polygon with multiple intruding points as in FIGS. 7 and 8 but a limited number of cut lines.

FIGS. 13A and 13B show the polygon of FIG. 10 with a convex subset shaded within the outer outline.

DETAILED DESCRIPTION OF THE INVENTION

Figure 3:
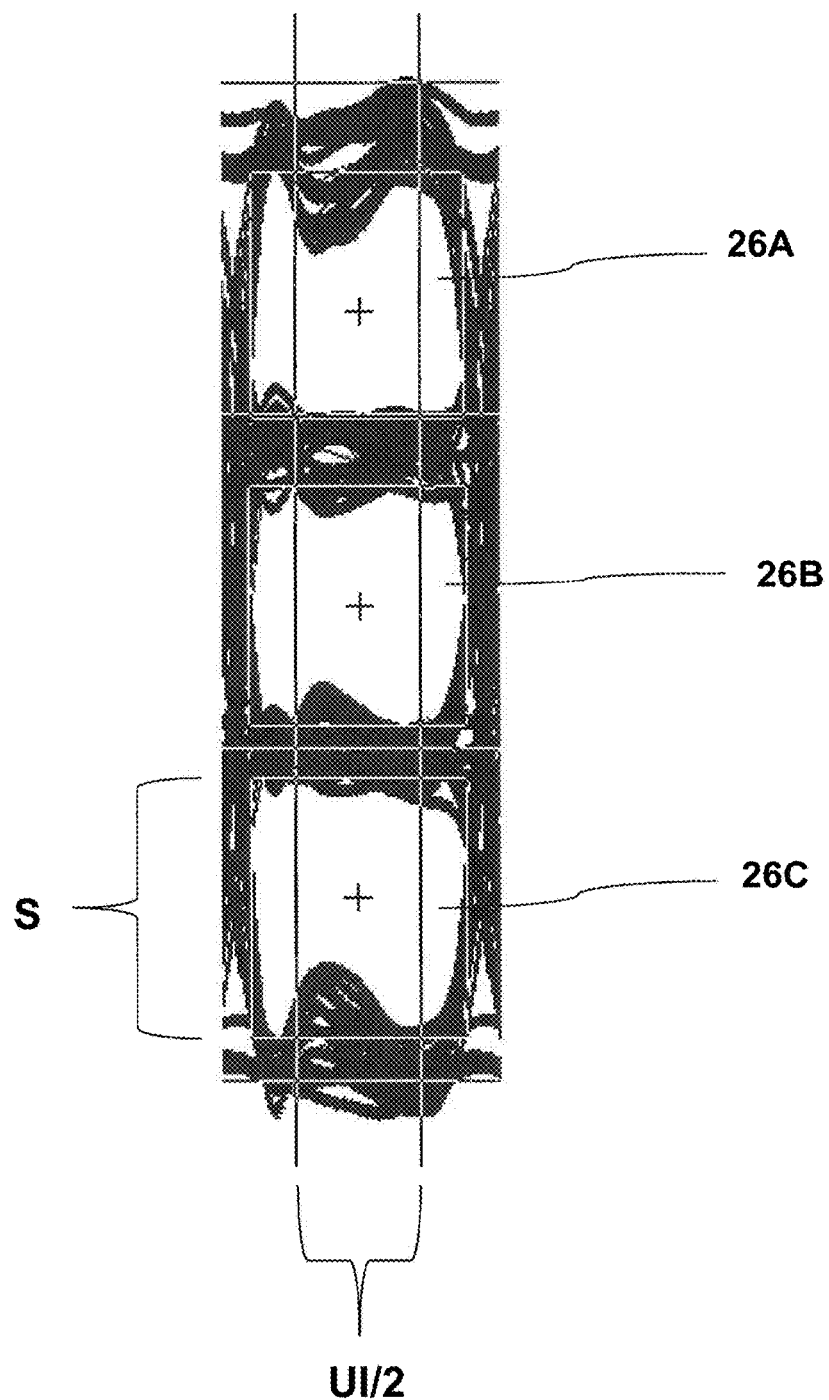
FIG. 3 is a PAM4 eye diagram like FIG. 2 but in which the pixels are square.
Figure 4:
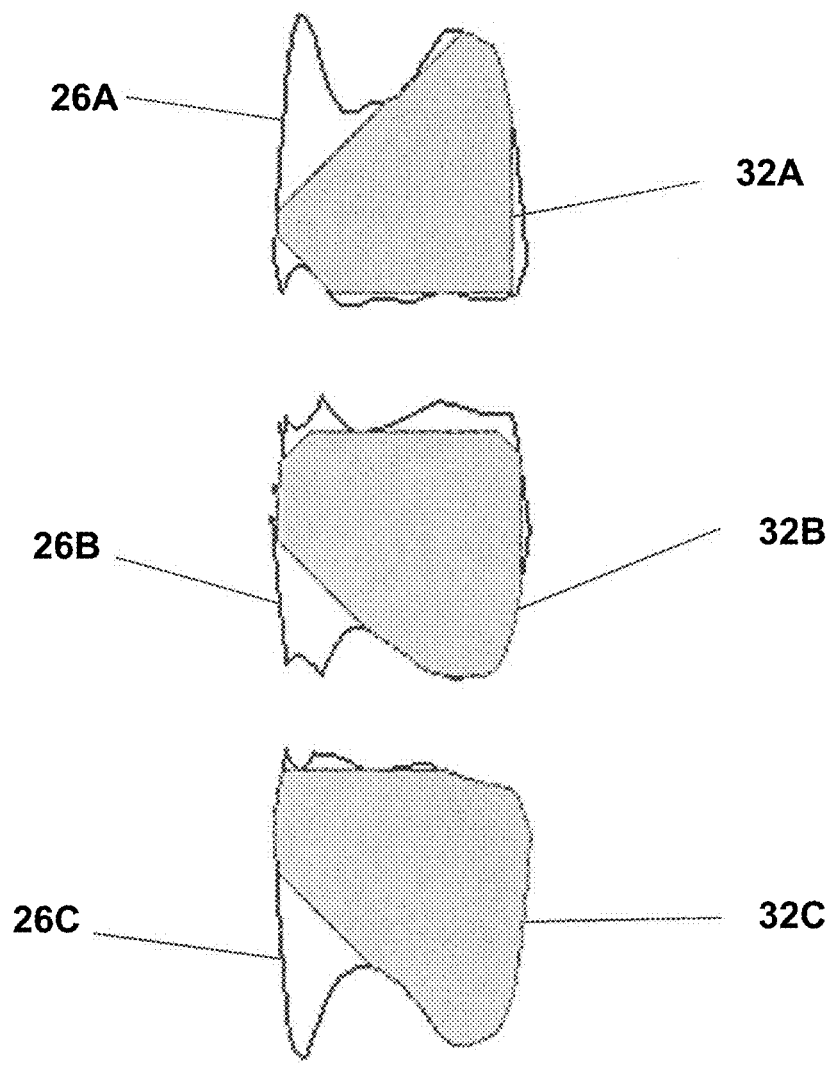
FIG. 4 is a PAM4 diagram like FIG. 3 in which the original eye is outlined and the largest convex area inside each eye is shaded.

The eye diagram itself is a PDF (probability distribution function). The first step in automatically analyzing an eye diagram is to reduce the categories of pixels from a large number (based on the probability at each pixel) down to two categories of pixels. Picking a predefined probability, e.g., $10^{-6}$, any point in the eye diagram whose value is less than $10^{-6}$ is colored white and all other points are colored black. This can be seen in the image of a PAM4 eye diagram in FIG. 3. This is the same eye diagram as in the previous diagram but here the pixels are square.

The second step is to identify the eye(s) 26A, 26B, 26C in the diagram. This can be problematic, since some regions may appear as pseudo-eyes if each of their points have probability below the threshold, even though they are not actually eyes. These pseudo-eyes are of no interest in analyzing the system but complicate the automatic process of identifying the eyes. An eye is identified by (1) bounding its possible region in the eye diagram and (2) selecting the largest object in that region. The region for each eye is bounded in time to the middle half of the unit interval UI/2. It is bounded in signal (S) level by the specific signal levels just below and just above the eye, i.e., by the two signal levels that will be used to distinguish the eye. In the diagram in FIG. 3 the eyes are surrounded by bounding boxes and marked with a cross at their centroid (which are not the, as yet undetermined, sampling points).

For each eye 26A, 26B, 26C, a convex region 32A, 32B, 32C within the eye is found. A convex shape is used because any protrusions in the eye are of no interest when determining a sampling point, and make the analysis difficult. It is desirable to find the largest convex region within the eye so as to permit the greatest latitude in selecting an optimum sampling point.

A non-exhaustive search of the literature of computational geometry found no process for computing a largest convex region inside a polygon. (The eye is on a pixelated grid and so its border is a polygon with a large number of edges.) One reason for such a lack may be that in the general mathematical case there is not a unique solution, although for the practical case of eyes in eye diagrams such non-uniqueness is not only never expected but irrelevant even if it occurs.

A process to find the provably largest convex region would require a complex and computationally exhaustive search of a large number of possibilities. Instead a fast process that provides an excellent approximation (at least) has been developed.

The result of this process is shown in the diagram below. Each original eye is outlined in black and the largest convex area inside each eye is shaded grey.

Finding the maximum (i.e., largest area) convex subset of a polygon produces a second, smaller polygon as a result. (While it is possible that the solution is not unique, this possibility is of no interest and is ignored here.)

Figure 5:
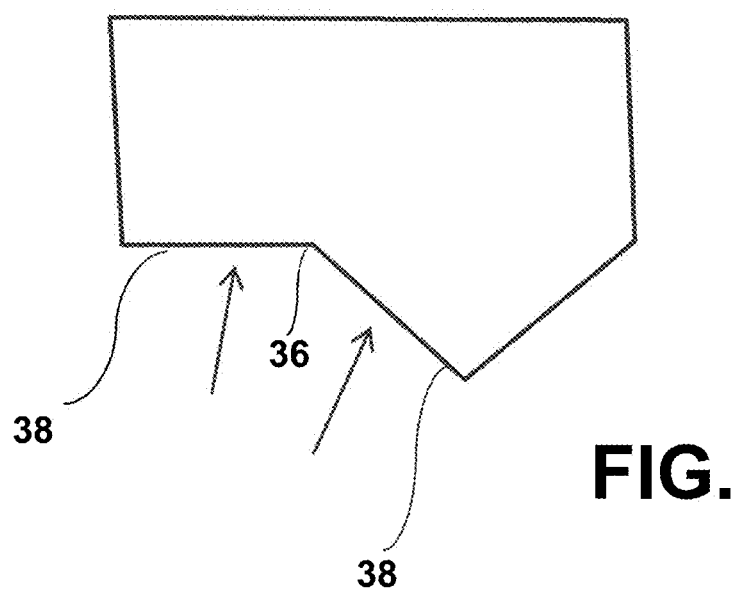
FIG. 5 is a polygon that has one concavity.

FIG. 5 shows a polygon that has one concavity formed by the indicated edges. This one concavity 36 creates two protrusions 38, one on either side of it. Mathematically a shape is convex if, given any two points within the shape, the straight line connecting them is entirely within the shape.

Figure 6:
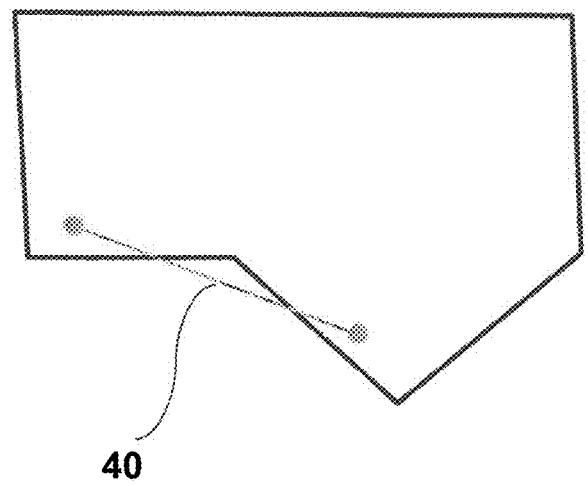
FIG. 6 shows FIG. 5 with a cut line spanning the concavity.

While it is clear to the eye that the polygon in FIG. 5 is not convex, it is proved by finding two points within the polygon whose connecting straight line does not lie entirely within the polygon. The line 40 in FIG. 6 that connects the two points (each chosen to be in a different protrusion), does not lie entirely within the polygon, proving that it not convex.

Finding any convex subset of a polygon (not necessarily a maximum subset) consists of cutting off the protrusions created by the concavities. For example, a convex subset of the polygon above can be obtained by one cut operation that eliminates parts of one or both protrusions. The next figure shows one possible cut line in FIG. 6A and the resulting convex polygon in FIG. 6B.

Many cut lines are possible, as shown in FIGS. 6A and 6C. Each yields a different convex polygon.

When a concavity is defined by multiple intruding points, the situation is more complex.

Figure 7:
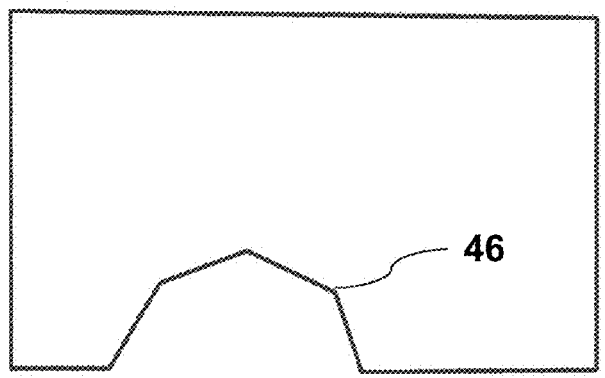
FIG. 7 shows a polygon with multiple intruding points.
Figure 8:
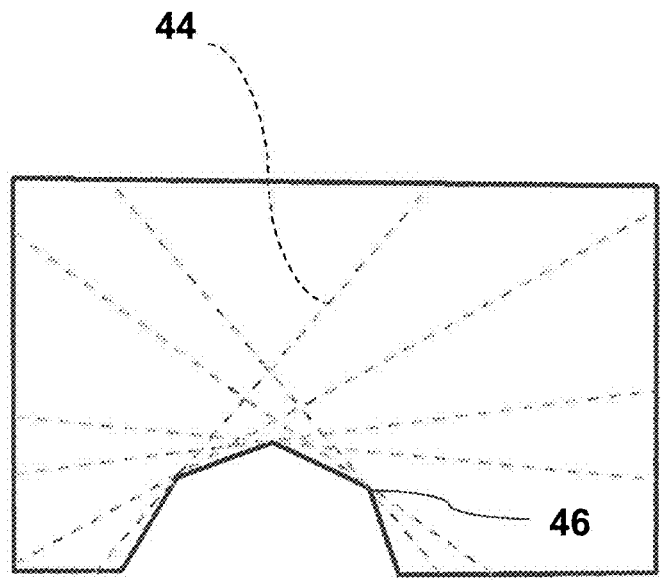
FIG. 8 shows the FIG. 7 polygon with multiple possibly cut lines.

Consider the polygon in FIG. 7. Its cut lines 44 can pass through any one of the three intruding vertices 46, as shown in FIG. 8.

As described above there are an infinite number of possible cut lines. However, in practice as shown in FIG. 8 we work on a pixelated grid and all polygon vertices are restricted to this grid. In this case, there are only a finite number of possible cut lines, yet the number of possibilities can still be large.

Figure 9:
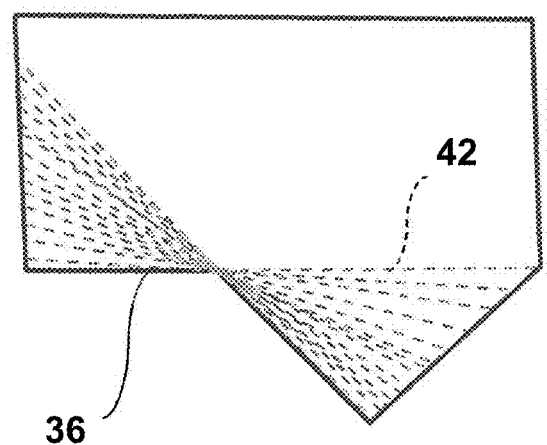
FIG. 9 shows the polygon of FIGS. 5 and 6 with multiple cut lines.

Finding the largest convex region means we must allow the cut line 42 to end at any pixel on the perimeter of the polygon. The following diagram illustrates the idea that there are a large number of possibilities for every concavity. For a single concavity (as shown in FIG. 9) one need not do an exhaustive search. But, with multiple interacting concavities an exhaustive search must be done, so the effect of combinatorics as shown here is real.

Figure 10:
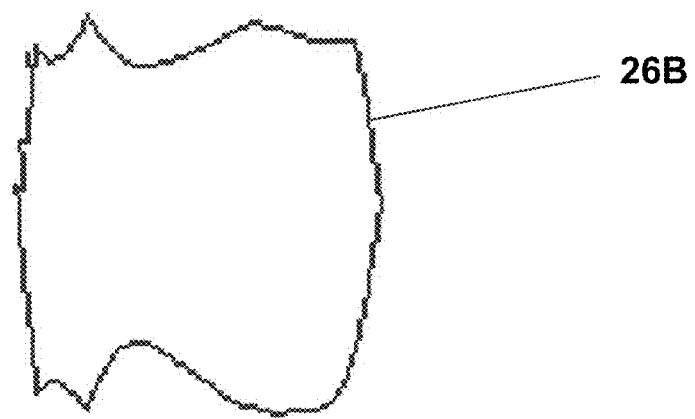
FIG. 10 is a real polygon like the middle eye diagram of FIG. 3

The combinatorical situation is even worse when working with polygons that have a large number of vertices. This is the case when the polygons are specified in a contiguous manner, i.e., starting at any perimeter pixel p1 the next perimeter pixel p2 is one of the eight pixels adjacent to p1. An actual and typical example of such a polygon 26B is shown the FIG. 10. It has 340 vertices. When there are multiple concavities there are usually multiple cut lines, one per concavity. (The exception is when a cut line for one concavity completely cuts away at least one of the protrusions forming another concavity. This second concavity can then be ignored.)

Figure 11:
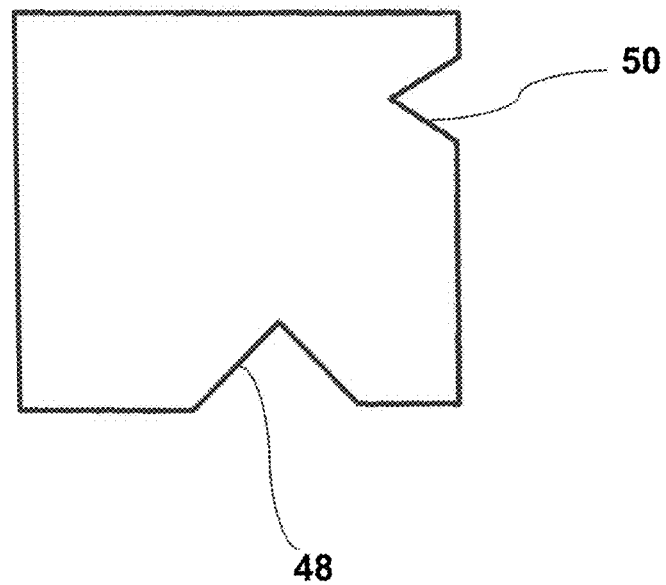
FIGS. 11, 11A and 11B show a polygon with two concavities and example cut lines.
Figure 11A:
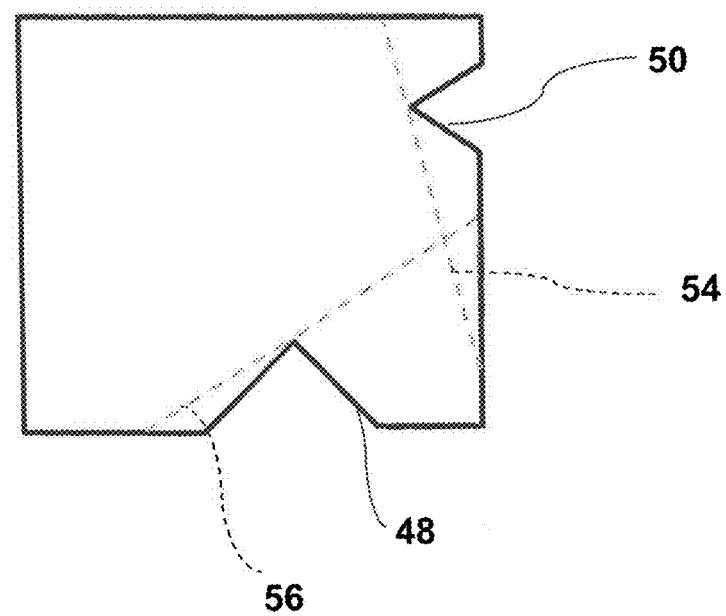

A polygon with two concavities 48, 50 (forming three protrusions) is shown in FIG. 11. Each of these two concavities will have a cut line. One possible pair of cut lines is shown in FIG. 11A.

Figure 11B:
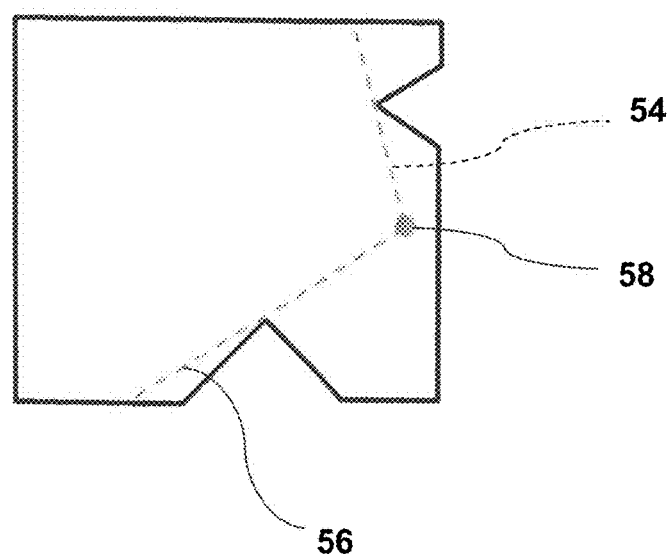

This illustrates another complicating feature, which is that a cut operation does not always end on a point on the perimeter of the original polygon. In the example of FIG. 11B, both cut lines have one end point on the perimeter and one at the point marked with the dot shown in FIG. 11B.

Finding the maximum convex subset generally requires that the cut lines be considered together, because one cut line can change the effect of other cut lines. Again, this means that an exhaustive or near-exhaustive search must be done that considers all combinations of all cut lines for all intrusions. This can be computationally too expensive.

The process disclosed herein is based on recognizing several factors.
1. A near-optimum convex region is as good in practice as the optimum convex region.
2. As a practical matter, interactions between cut lines can generally be ignored as a second order effect. This is a key simplification, because it 1) allows an process to handle concavities one at a time instead of handling all of them together and 2) implies that both ends of all cut lines lie on the perimeter and not in the middle of the polygon.
3. In searching for a near-optimum rather than an optimum convex region, not all possible cut lines need be considered. In fact, the number is grossly reduced by considering only those cut lines that are extensions of segments of the contiguous polygon.

Figure 12A:
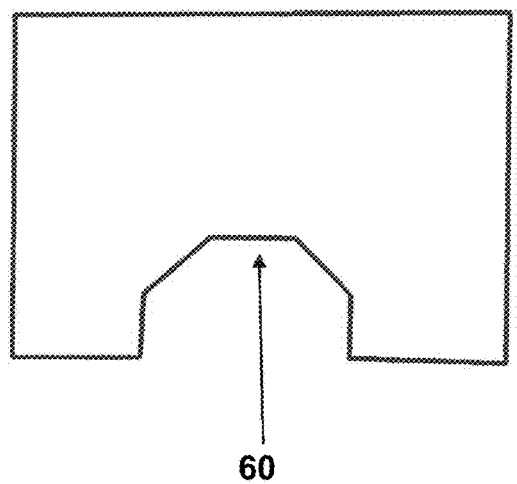

On a pixelated grid with contiguous perimeters, all perimeter straight line segments are either horizontal, vertical or at a 45° angle. A simple concavity 60 might look like FIGS. 12A and 12B.

This method only considers the five cut lines shown in FIG. 12B, each of which is an extension of one segment of the polygon:

The best of these cut lines differs in orientation from the optimal cut line by at most 22.5° (one half of 45°), since it must lie somewhere between the 0° (horizontal), 45°, and 90° (vertical) cut lines. Assuming that the polygon angles occur randomly (a reasonable assumption), the average error will be half of that, or about 11°. These are acceptable tolerances for cutting off protrusions which generally are themselves just a small fraction of the original polygon.

This method is as follows:
1. Find a concavity 60 of the polygon, using any method known in the art.
2. Find all cut lines 62 that can be created by extending a polygon segment at the concavity
3. For each cut line, calculate the area of the polygon that would result if that cut was made
4. Make a cut along the cut line that produces the largest area polygon after the cut.
5. Repeat the above steps with the polygon that was produced by the cut until there are no concavities left.

A typical result is shown in FIGS. 13A and 13B. The original contiguous polygon 26B is shown in black and the convex subset 32B in grey.

Figure 14:
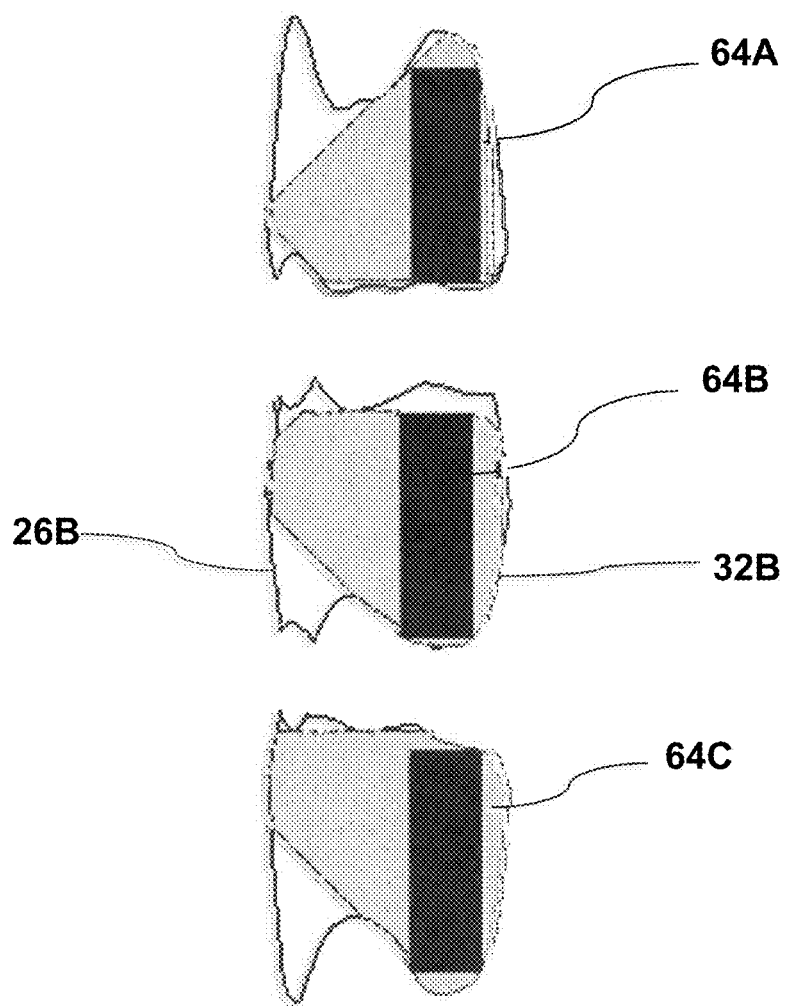
FIG. 14 is a PAM4 eye diagram like FIG. 3 in which the largest rectangles are filled into each convex area.

For each convex region (one per eye) the largest rectangle 64B of the aspect ratio that fits in the convex region 32B must be found. The result is shown in FIG. 14, where the black rectangles 64A, 64B, 64C represent the largest orthogonal rectangle that has the predetermined aspect ratio and fits within each grey convex area.

The aspect ratio of a rectangle is the ratio of its width to its height. In this case, it refers to the unit interval of the eye diagram, i.e. the width, and to the height of the diagram as defined by upper and lower signal levels in each eye.

A rectangle is orthogonal if its sides are vertical and horizontal, i.e., it is not on an angle. A polygon is contiguous if its perimeter is specified by a contiguous sequence of pixels. A region is convex if, given any two points within the shape, the straight line connecting them is also entirely within the region.

Figure 15A:
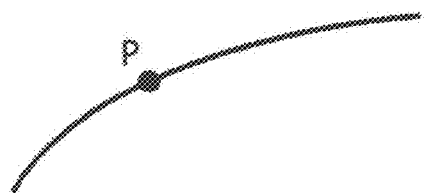
FIGS. 15A, 15B, 15C and 15D are a series of diagrams for deriving the largest rectangle that fits within a polygon.

For a given aspect ratio, knowing any two corners of the rectangle completely determines the rectangle. Consider a point P on the polygon's perimeter as shown in FIG. 15A. (This method works on a pixelated grid but the pixelation is not shown in the diagrams.)

Figure 15B:
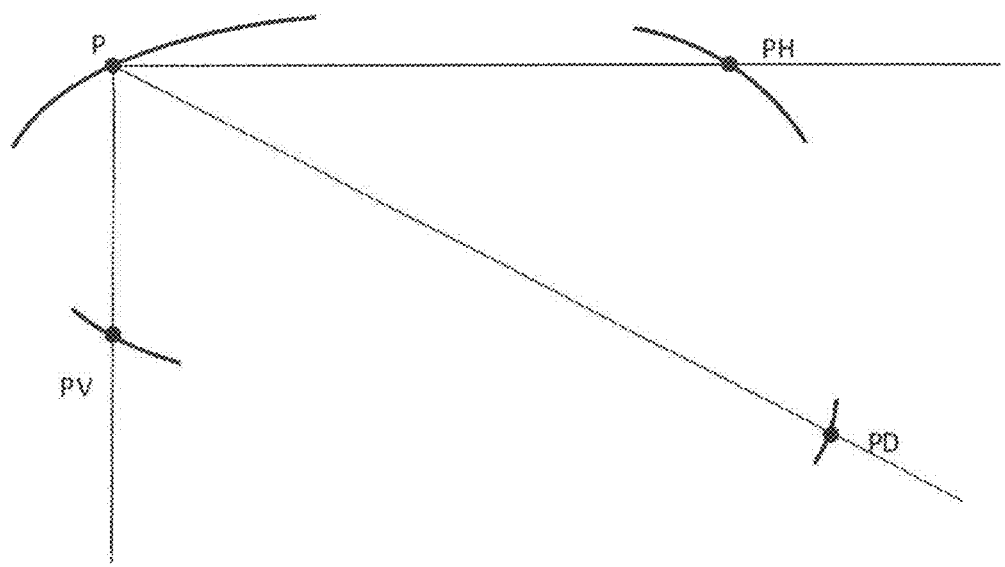

For any rectangle as shown in FIG. 15B that has a corner at P, each of the rectangle's other three corners will have two constraints: (1) that the corner must be inside the polygon and (2) that the entire rectangle must also be inside the polygon.

The first step of the method is to select an arbitrary point P on the convex region and project straight lines from P horizontally, vertically and diagonally. The angle of the diagonal line is determined by the desired aspect ratio, so that the line will pass through the corner opposite P. Find the points PH, PV and PD where the horizontal, vertical and diagonal lines intersect with the polygon again. Because the polygon is convex these other intersections are unique (ignoring the special case in which the polygon itself has sides that are horizontal, vertical or diagonal at the correct angle).

One possible configuration is shown in FIG. 15B.

Figure 15C:
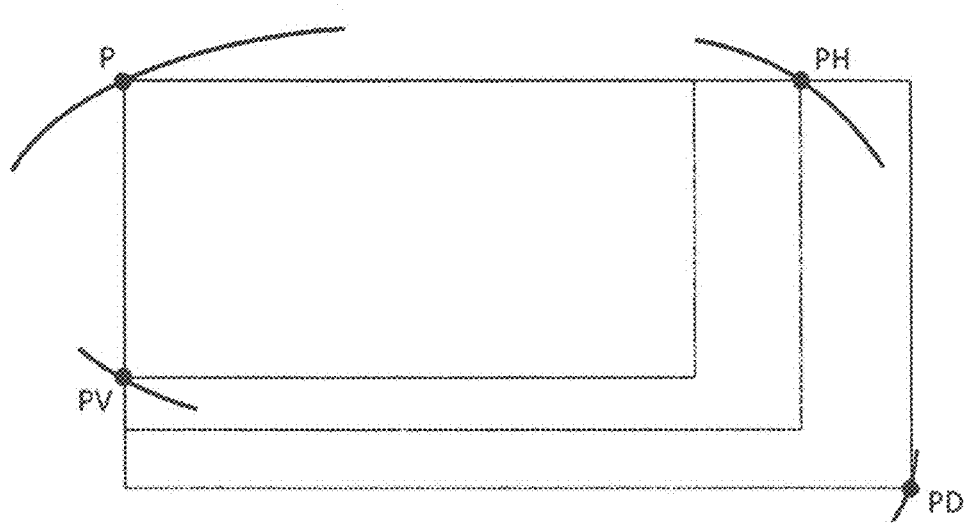

In conjunction with point P, each of PH, PV and PD can define a different rectangle that has the desired aspect ratio, as shown in FIG. 15C.

But, because we know the polygon is convex, the smallest of these rectangles is the rectangle we seek for point P. It is the largest orthogonal rectangle with one corner at P and with the correct aspect ratio that fits inside the polygon. In the figure above it is the rectangle determined by PV.

Figure 15D:
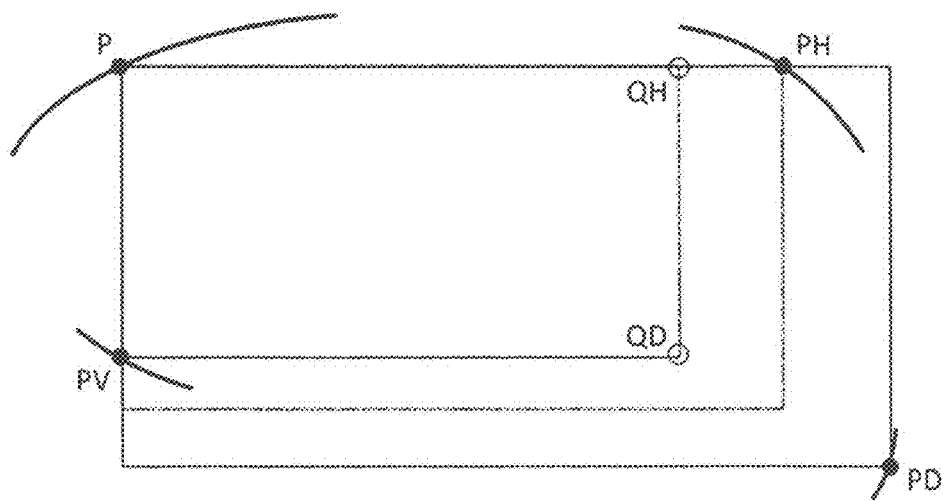

The proof of this is as follows.
Certainly no larger rectangle is possible, for then the lower left corner would be below PV which would place it outside the polygon. It remains to show that the rectangle determined by PV is entirely within the polygon. Consider the remaining rectangle corners QH and QD as shown in FIG. 15D.

By convexity, because P and PH are in the polygon so is QH.

By convexity, because P and PD are in the polygon so is QD.

By convexity, because all four corners of the rectangle are in the polygon so are all four sides of the rectangle.

Because any interior point of the rectangle lies on some straight line connecting points on the sides of the rectangle, then by one final use of convexity that interior point is also in the polygon.

This demonstrates that, because the polygon is convex, we need not check whether the rectangle is wholly contained within the polygon. By selecting the smallest of the three rectangles we are guaranteed to have the correct rectangle based at point P.

Finally, the process is as follows:

Pick a point P on each convex region and project straight lines from P horizontally, vertically and diagonally to find points PH, PV and PD.

Select the smallest of the three rectangles determined by PH, PV and PD as the rectangle for point P.

Repeat the previous steps for all perimeter points (this is all inclusive because the polygon is contiguous) to determine the rectangle for each point. Select the largest such rectangle.

Figure 1:
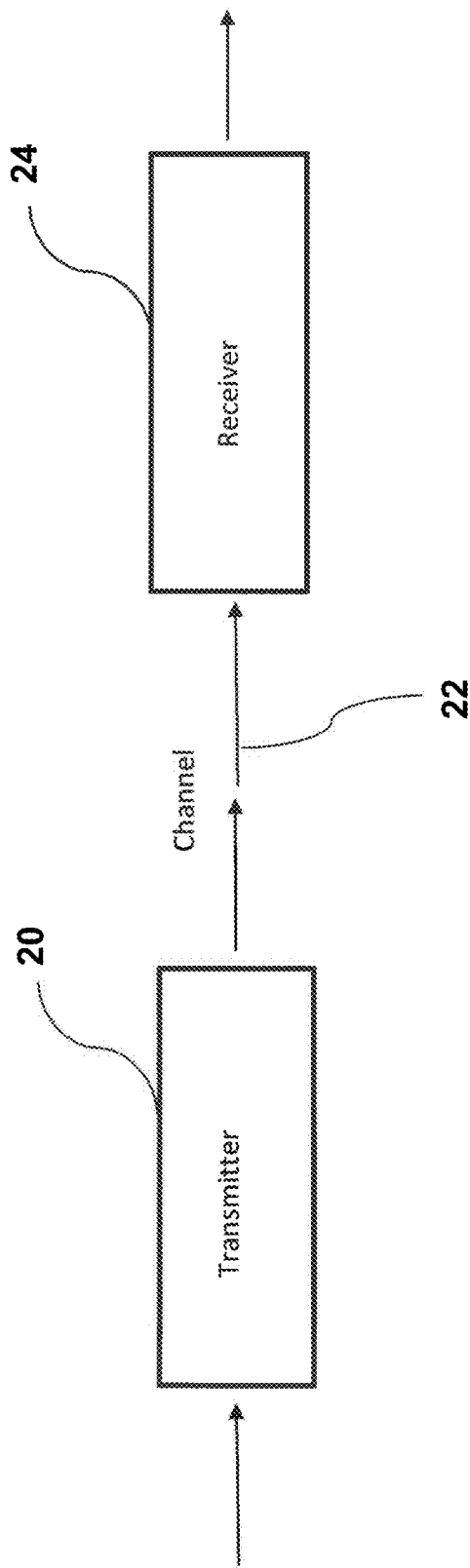
FIG. 1 is a block diagram of a communications system in which an embodiment of the present invention is implemented.
Figure 2:
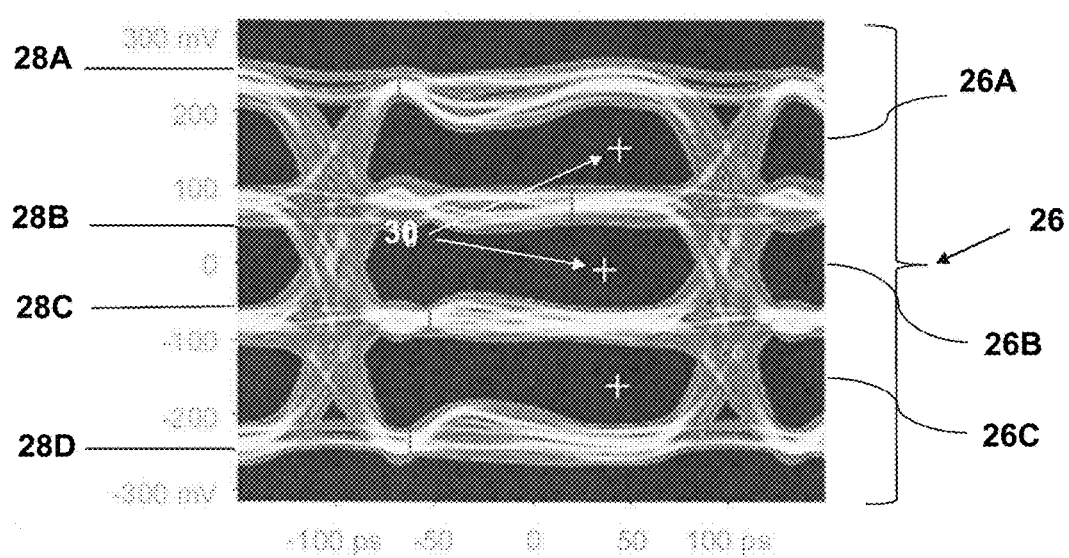
FIG. 2 is a sample eye diagram for a PAM4 or four-symbol communications standard.
Figure 16:
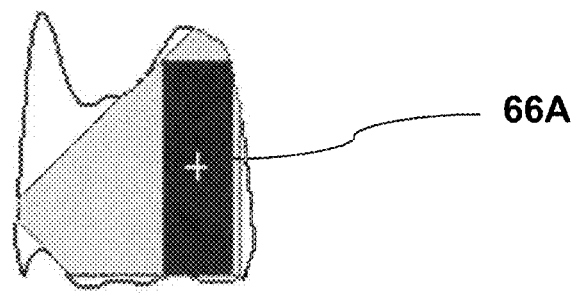
FIG. 16 is a copy of FIG. 14 in which each diagram contains a largest rectangle and a sampling point "+".
Figure 16:
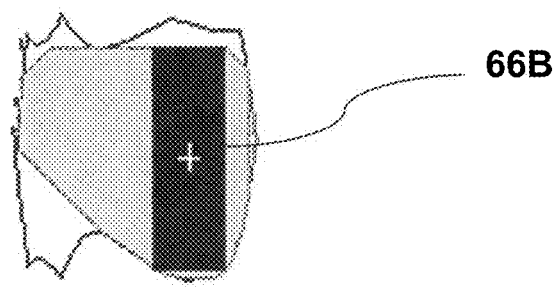
Figure 16:
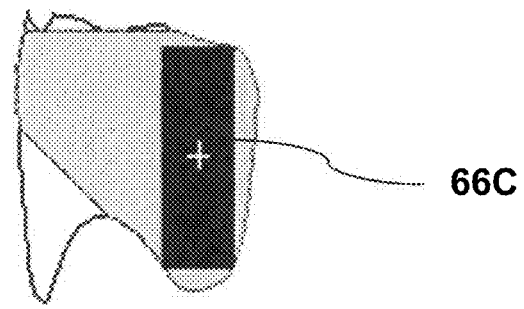
Figure 17A:
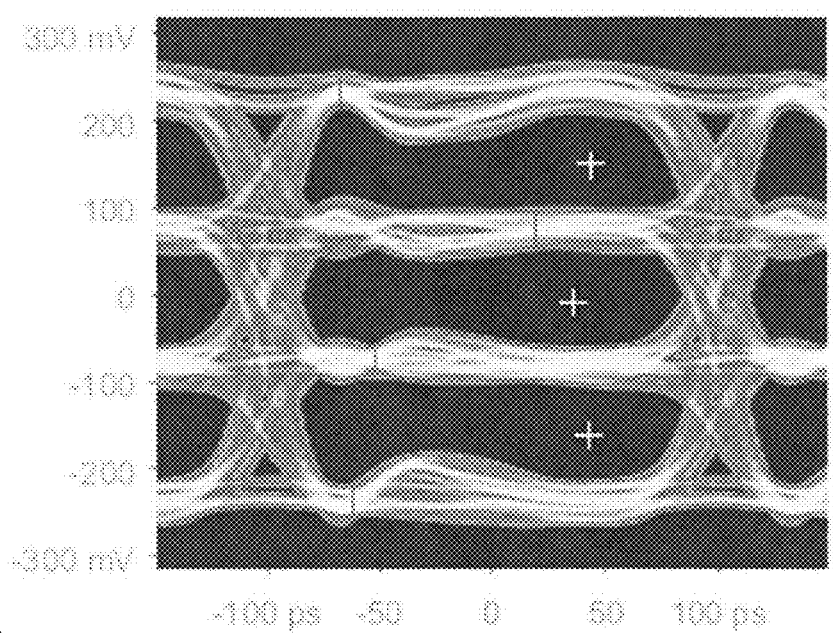
FIGS. 17A and 17B show the eye diagram of FIG. 2 before and after coercing the sampling points into a common time interval.

Once the largest rectangle has been found for each convex region, the optimum sampling point 66A, 66B, 66C for an eye is selected as the center of the rectangle, as shown in FIG. 16:

The crosses define the sampling points shown in FIG. 2, reproduced again in FIG. 17A. Note that the sampling points in FIG. 17A are not necessarily vertically aligned; i.e. in phase.

Optionally, although each eye has been analyzed independently, a common sampling phase 70 may be enforced. When this option is used, the sampling points found above are coerced into a time interval that all the eyes have in common (which may be a narrow range for some systems) with their thresholds adjusted as necessary. For example, by:

1) Determine a phase range that is common to all eyes. If no such range exists, there is no constrained solution.
2) Compute the average of the phases. If it is within the common range, use this phase for all sampling points. Otherwise, use the midpoint of the common range.
3) For each eye, select as its decision threshold the vertical midpoint at the common phase.

Figure 17B:
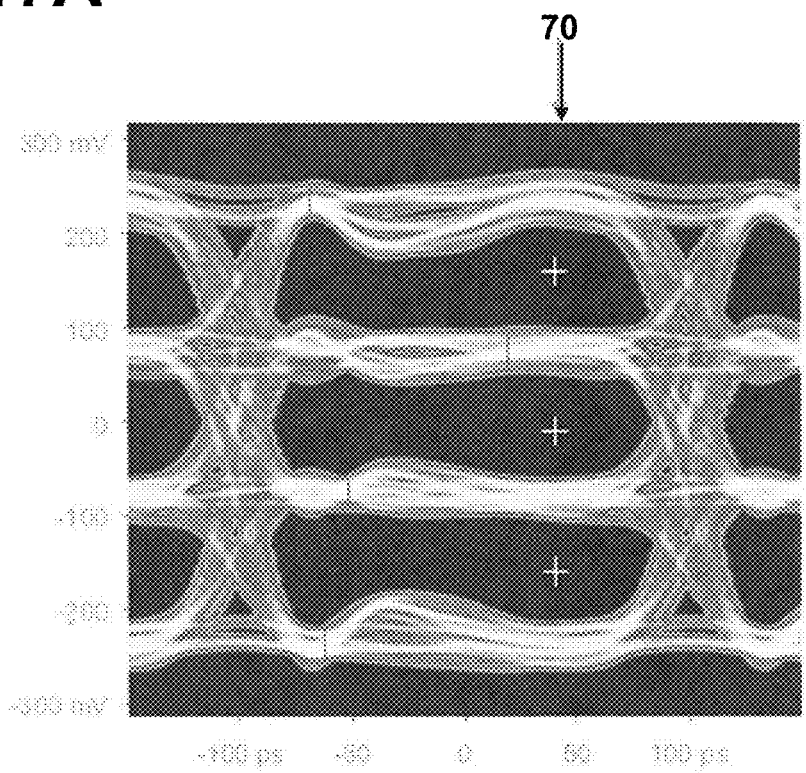

The image in FIG. 17B shows an example output when the sampling points above are coerced into a common time interval. As can be seen in FIG. 17B, the white sampling points are closer to each other on the horizontal axis.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A communications system, comprising:
    a transmitter configured to transmit a signal, the signal including a sequence of symbols, each symbol associated with a respective signal level;
    a receiver configured to:
        receive the signal including the sequence of symbols,
        generate an eye diagram of the signal by plotting the a representation of the signal on a unit interval graph having a horizontal axis indicating a unit interval of time and a vertical axis indicating a signal level, the eye diagram having one or more polygon shaped-eyes,
        determine a maximal convex subset within each eye by trimming the polygon shape of each eye along one or more cut lines to remove one or more concavities of the polygon shape, and
        determine a largest orthogonal rectangle that fits in the maximal convex subset of each eye, and
        select, for each eye, a sampling point at the signal level equal to the center of the largest orthogonal rectangle, the sampling point representing a symbol in the sequence of symbols; and
    a channel coupling the transmitter to the receiver.

2. The communications system according to claim 1 in which each sampling point is positioned at the center of the respective largest orthogonal rectangle.

3. The communications system according to claim 1 in which each sampling point is aligned in phase with the other sampling points.

4. The communication systems according to claim 3 in which the receiver is further configured to:
    align each sampling point in phase with the other sampling points by determining a phase range common to each sampling point, and
    set the sampling point for each eye at the average of the phases of the eyes.

5. The communication systems according to claim 3 in which the receiver is further configured to:
    align each sampling point in phase with the other sampling points by determining a phase range common to each sampling point, and
    set the sampling point for each eye at a vertical midpoint of the phase range common to each sampling point.

6. The communication systems according to claim 1 in which the receiver is configured to determine the largest orthogonal rectangle that fits within the maximal convex subset of each eye by:
    determining an aspect ratio,
    selecting a point on the respective maximal convex subset,
    projecting a horizontal straight line, a vertical straight line, and a diagonal straight line from the point until each line intersects the maximal convex subset at an intersecting point,
    for each intersecting point, drawing a respective rectangle from the point and the respective intersecting point based on the aspect ratio, and
    selecting the smallest respective rectangle as the largest orthogonal rectangle.

7. The communication systems according to claim 1 in which the receiver is configured to determine the largest orthogonal rectangle that fits within the maximal convex subset of each eye by:
    determining an aspect ratio,
    for each point on a perimeter of the maximal convex subset:
        projecting a horizontal straight line, a vertical straight line, and a diagonal straight line from the point until each line intersects the maximal convex subset at an intersecting point,
        for each intersecting point, drawing a respective rectangle from the point and the respective intersecting point based on the aspect ratio, and
        selecting the smallest respective rectangle, and
    selecting the largest of the smallest respective rectangles of the points on the perimeter.

8. A method of multi-symbol communications from a transmitter to a receiver via a channel, including transmitting signals as a waveform representing a sequence of symbols, each symbol of unit-interval duration and each symbol associated with its own signal level, the method comprising:
    generating an eye diagram of the waveform by plotting the waveform on a unit interval graph having a horizontal axis representing a unit interval of time and a vertical axis representing a signal level, the eye diagram having one or more polygon-shaped eyes, determining a convex polygon region within each eye by trimming the polygon shape of each eye along one or more cut lines to remove one or more concavities of the polygon shape, and determining a largest rectangle that fits in the convex polygon region of each eye, and selecting, for each eye, a sampling point at the signal level equal to the center of the largest rectangle, the sampling point representing a symbol in the sequence of symbols.

9. The method according to claim 8 further comprising positioning each sampling point at the center of the respective largest rectangle.

10. The method according to claim 8 further comprising aligning each sampling point in phase with the other sampling points.

11. The method according to claim 10 in which aligning each sampling point in phase with the other sampling points includes:

determining a phase range common to each sampling point, and setting the sampling point for each eye at the average of the phases of the eyes.

12. The method according to claim 10 in which aligning each sampling point in phase with the other sampling points includes:

determining a phase range common to each sampling point, and setting the sampling point for each eye at a vertical midpoint of the phase range common to each sampling point.

13. The method according to claim 8 in which determining the largest orthogonal rectangle that fits within the convex polygon region of each eye includes:

determining an aspect ratio, selecting a point on the respective convex polygon region, projecting a horizontal straight line, a vertical straight line, and a diagonal straight line from the point until each line intersects the convex polygon region at an intersecting point, for each intersecting point, drawing a respective rectangle from the point and the respective intersecting point based on the aspect ratio, and selecting the smallest respective rectangle as the largest orthogonal rectangle.

14. The method according to claim 8 in which determining the largest orthogonal rectangle that fits within the convex polygon region of each eye includes:

determining an aspect ratio, for each point on a perimeter of the convex polygon region:

projecting a horizontal straight line, a vertical straight line, and a diagonal straight line from the point until each line intersects the convex polygon region at an intersecting point, for each intersecting point, drawing a respective rectangle from the point and the respective intersecting point based on the aspect ratio, and selecting the smallest respective rectangle, and selecting the largest of the smallest respective rectangles of the points on the perimeter.

\* \* \* \* \*